N. F. SANDELIN.
Improvement in Cotton Planters.
No. 124,450.
Patented March 12, 1872.
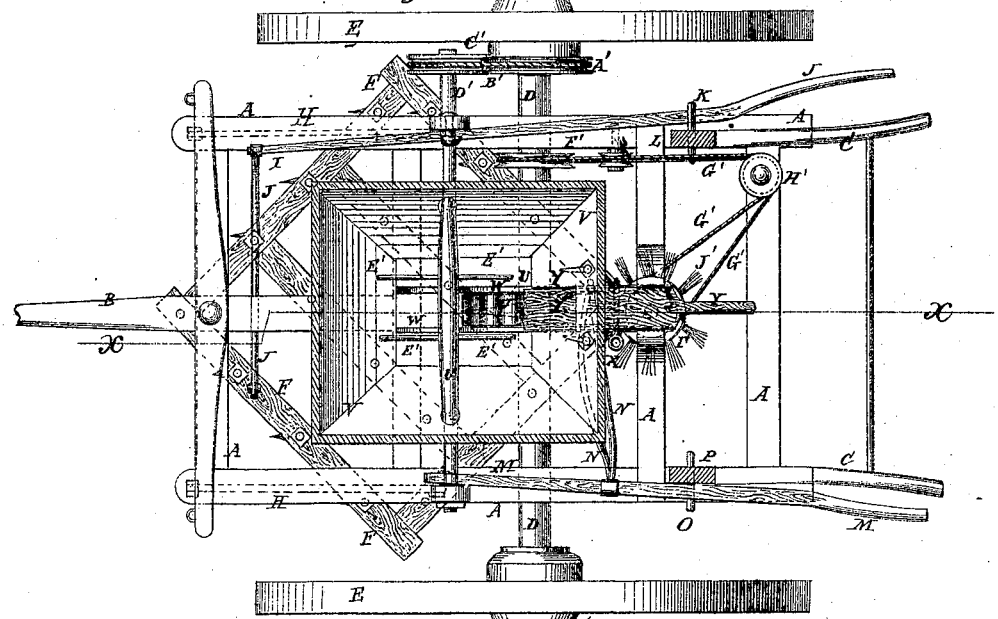
Fig. 1
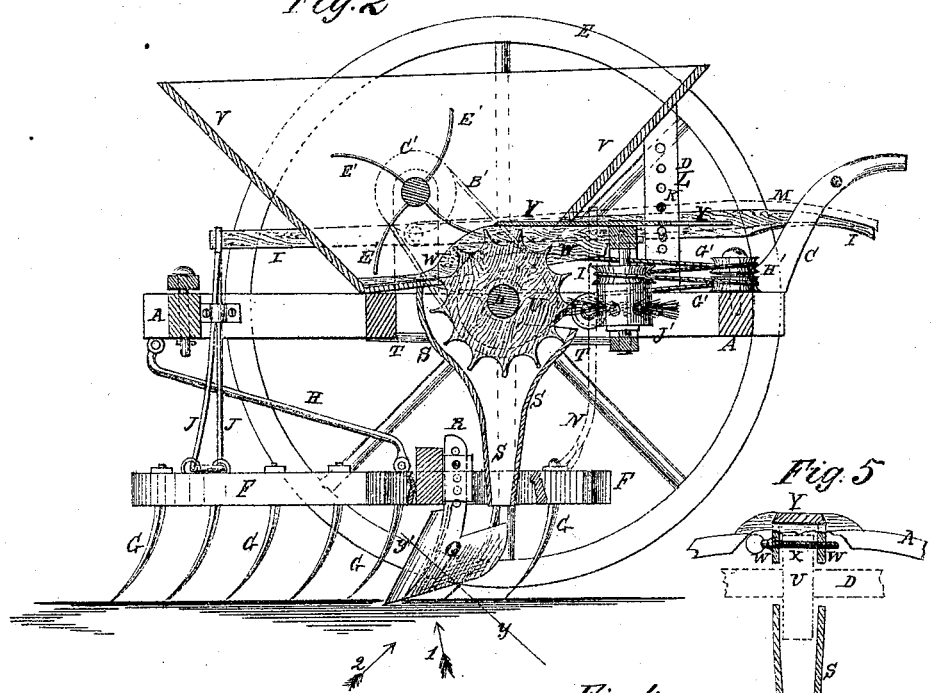
Fig. 2
Fig. 3
Fig. 4
Fig. 5
Witnesses:
Inventor:
Nils F. Sandelin 124,450

UNITED STATES PATENT OFFICE.

NILS F. SANDELIN, OF NEW YORK, N. Y.

IMPROVEMENT IN COTTON-PLANTERS.

Specification forming part of Letters Patent No. 124,450, dated March 12, 1872; antedated February 22, 1872.

SPECIFICATION.

I, NILS F. SANDELIN, of the city of New York, county and State of New York, have invented certain Improvements in Cotton-Seed Sowers, of which the following is a specification:

My invention has for its object to furnish an improved cotton-seed sower, simple in construction, effective in operation, and easily and conveniently controlled; and it consists in the construction, combination, and arrangement of various parts of the machine, as hereinafter more fully described.

Figure 1 is a top view of my improved cotton-seed sower. Fig. 2 is a detail vertical section of the same taken through the line $x\ x$ of Fig. 1. Fig. 3 is a bottom view of the furrowing-plow, looking in the direction of arrow 1. Fig. 4 is a detail sectional view of the same taken through the line $y\ y$ of Fig. 2, and looking in the direction of the arrow 2. Fig. 5 is a detail sectional view of the dropping device.

Similar letters of reference indicate like parts.

A is the frame-work of the machine, to the forward end of which is attached the tongue B, and to the rear end are attached the handles C. D is the axle, which revolves in bearings attached to the frame A, and upon the journals of which are placed the wheels E, one of which revolves loosely, and the other is rigidly attached to the said axle, so as to carry it with it in its revolution. F is the frame of a harrow, which is placed beneath the frame A for the purpose of stirring up and loosening the soil before the seed is put into it. The frame F is made square, and is formed by connecting the ends of a number of parallel parts by cross-bars. The frame F is placed diagonally with the frame A, and to it are attached the teeth G, which are curved upon arcs of circles having their centers about in line with the pivoted upper ends of the draft-bars H, by which the harrow is drawn. The lower and rear ends of the draft-bars H are pivoted to the frame F at or near its side angles, and their forward ends are pivoted to the frame A at or near its forward end. This arrangement of the draft-bars H allows either end of the harrow to be raised as may be required. When the forward end of the harrow is raised the form of the harrow-teeth causes them to run out of the ground; and when the rear end of the harrow is raised the form of the harrow-teeth causes them to draw out of their places in the soil without lifting up said soil, since they move through the arcs of circles of which they form parts. The forward end of the harrow is raised by the lever I, which is pivoted to a standard attached to the frame A, and to its forward end are pivoted the upper ends of the connecting-rods J, the lower ends of which are spread apart, and are pivoted to the side-bars of the harrow-frame F near its forward angle. The rear end of the lever I extends back along the side of the handle C into such a position that it may be conveniently reached and operated by the plowman. The lever I is secured in position to hold the forward end of the harrow raised to any desired extent by a pin, K, inserted above the said lever I in one or the other of a series of holes formed in the standard L attached to the rear part of the side-bar of the frame A. The rear end of the harrow is raised by the lever M, the forward end of which is pivoted to a standard attached to the middle part of the said bar of the frame A, and to its middle part are pivoted the upper ends of the connecting-rods N, the lower ends of which are pivoted to the harrow-frame F at or near its rear angle. The rear end of the lever M extends back along the side of the handle C into such a position that it may be conveniently reached and operated by the plowman. The lever M is held in place to hold the rear part of the harrow raised from the ground to any desired extent by the pin O, which is inserted below the lever M in one or the other of the holes in the standard P attached to the rear part of the side-bar of the frame A. By this arrangement either end of the harrow may be raised to any desired extent, and, by operating the two levers at the same time, or one after the other, the entire harrow may be raised from the ground for convenience in turning, passing obstructions, or passing from place to place. Q is the furrowing-plow or opener, the standard R of which is adjustably secured to the harrow-frame F, or to a bar attached to the same frame, by a bolt which passes through one or the other of the holes formed through the said standard for that purpose, so that the said plow can be readily adjusted to run deeper or shallower in the soil, as may be desired. The plow Q is made with a wing upon each side, and with its point inclined downward, or, rather, with its base inclined upward, as shown in Fig. 2. The plow Q is made with a swell or convexity a little above its base, so that it may be narrower or thinner at its base than it is a little distance above said base, as shown in Fig. 4. The effect of this construction is to cause the sides of the furrow to tend to fall inward and cover the seed in the rear of the said plow. The covering of the seed is completed by the last two teeth of the harrow, just in front of which the plow is placed, and which are arranged side by side, and at such a distance apart as to force the sides of the furrow made by the plow inward, and thus fill the said furrow sufficiently to cover the seed to the required depth. The seed is introduced into the furrow between the wings of the plow before any soil has fallen into the furrow by the conductor-spout S, the lower end of which extends down between the said wings. The upper part of the conductor-spout S is enlarged to receive the lower part of the dropping-wheel, and is attached to and supported by bars T, the ends of which are secured to the cross-bars of the frame A. The dropping-wheel U is rigidly attached to the shaft D, so as to be revolved by the revolution of the said shaft, and its upper part projects upward through a slot in the bottom of the seed-hopper V. The dropping-wheel U is made in the form of a narrow wheel, with semicircular notches formed in its face, and extending entirely across it, as shown in Fig. 2. In the slot in the bottom of the hopper V, upon the opposite sides of the upper part of the dropping-wheel U, are placed two bars or plates, W, the forward upper parts of which are cut away about in line with the sweep of the ends of the teeth of the wheel U. The rear ends of the plates W are connected by a screw, X, so that they may be drawn closer together to take up the wear, and to keep the said plates to the sides of the wheel U. Y is a slide passing in through the rear side of the hopper V, along the upper edges of the plates W, so that by adjusting the position of the slide Y above the wheel U the amount of seed carried out by said hopper may be regulated at will. To the inner end of the hub of the loose wheel E is attached a pulley, A', around which passes a band, B', which also passes around a pulley, C', attached to the end of the shaft D', which revolves in bearings in the sides of the hopper V, and to which are attached two series of vertical prongs E', which are made slightly curved, as shown in Fig. 2, and are so arranged that the said series may be in front and upon the opposite sides of the wheel U. By this arrangement the prongs E' and wheel U will be revolved in opposite directions and toward each other, so that the prongs may move the cotton seeds against the wheel U in the most favorable direction for them to be taken hold of and carried out by the wheel U. To axle D is attached a pulley, F¹, around which passes a band, G', which passes around two guide-pulleys H', pivoted to the rear part of the frame A. From the guide-pulleys H' the band G' passes around a pulley, I¹, attached to or rigidly connected with a horizontal wheel-brush, J', the journals of which revolve in bearings attached to the frame-work of the machine in such positions that the brush may sweep through the notches of the wheel V as they rise above the edge of the rear upper part of the conductor-spout S before they pass into the slot in the bottom of the hopper V, so as to clean the said wheel U from any fibers of cotton that may adhere to it.

Having thus described my invention, what I claim as new, and desire to secure by Letters Patent, is—

Claims.

1. The combination of the adjustable levers I M and connecting-rods J N, attached to the front and rear parts of the harrow, with the draft-rods H and harrow-frame F, provided with the adjustable furrowing-plow O, of the construction described and shown, for raising and lowering and inclining the said harrow and plow to any desired depth and proportion of depths of the furrowing and covering, substantially as specified.

2. The arrangement of the brush J', revolving horizontally, with the wheel U, hopper V, and conductor-spout S, substantially as herein shown and described and for the purpose set forth.

NILS F. SANDELIN.

Witnesses:
H. S. ANABLE,
EDW. F. DAVIS.